United States Patent
Sudit et al.

(10) Patent No.: US 9,462,065 B2
(45) Date of Patent: *Oct. 4, 2016

(54) SYSTEM AND METHOD FOR GENERATING USE STATISTICS FOR LOCATION-BASED APPLICATIONS

(71) Applicant: LOC-AID TECHNOLOGIES, INC., Carlsbad, CA (US)

(72) Inventors: Isaias Sudit, Delray Beach, FL (US); Naomi Morita, Mountain View, CA (US)

(73) Assignee: LOC-AID TECHNOLOGIES, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,704

(22) Filed: Jul. 6, 2015

(65) Prior Publication Data

US 2015/0312358 A1    Oct. 29, 2015

Related U.S. Application Data (60) Continuation of application No. 12/961,117, filed on Dec. 6, 2010, now Pat. No. 9,113,289, which is a division of application No. 11/805,078, filed on May 22, 2007, now abandoned.

(60) Provisional application No. 60/830,367, filed on Jul. 12, 2006.

(51) Int. Cl.
*H04M 3/42* (2006.01)
*H04L 29/08* (2006.01)
(Continued)

(52) U.S. Cl.
CPC ............... *H04L 67/18* (2013.01); *H04L 43/04* (2013.01); *H04L 43/06* (2013.01); *H04L 43/0876* (2013.01); *H04L 67/10* (2013.01);
(Continued)

(58) Field of Classification Search
USPC ......... 455/404.2, 412.1–412.3, 456.1–456.3, 455/457, 466
See application file for complete search history.

(56) References Cited

U.S. PATENT DOCUMENTS

| | | |
|---|---|---|
| 7,071,842 B1 | 7/2006 | Brady, Jr. |
| 7,085,578 B2 | 8/2006 | Barclay et al. |

(Continued)

OTHER PUBLICATIONS

International Search Report and Written Opinion of the International Searching Authority for International Application No. PCT/US07/73049.

(Continued)

*Primary Examiner* — Dai A Phuong
(74) *Attorney, Agent, or Firm* — Lewis Roca Rothgerber Christie LLP (57) ABSTRACT

A system for analyzing the use of location-based service applications including: a mobile device. A carrier-positioning infrastructure interacts with the mobile device for enabling the use of location-based applications by the mobile device. A mobile location-based application provider communicates with the carrier-positioning infrastructure to provide a location-based application to the mobile device. A location transaction platform monitors the use of the location-based application by the mobile device. An analytics server communicates with the location transaction platform and location stamps an occurrence of use of the location-based application by the mobile device and performs a task in accordance with predetermined rules as a function of the location-based stamp.

20 Claims, 4 Drawing Sheets

(51) Int. Cl.
*H04L 12/26* (2006.01)
*H04W 4/02* (2009.01)
*H04W 24/00* (2009.01)
*H04W 64/00* (2009.01)

(52) U.S. Cl.
CPC ............. *H04W 4/02* (2013.01); *H04W 4/028* (2013.01); *H04L 67/04* (2013.01); *H04W 24/00* (2013.01); *H04W 64/00* (2013.01)

(56) References Cited

U.S. PATENT DOCUMENTS

| | | | |
|---|---|---|---|
| 7,752,253 | B2 | 7/2010 | Manion et al. |
| 8,467,812 | B2 * | 6/2013 | Steer ...................... G08G 1/091 455/458 |
| 2002/0123354 | A1 | 9/2002 | Nowak |
| 2002/0193121 | A1 | 12/2002 | Nowak et al. |
| 2003/0096621 | A1 * | 5/2003 | Jana ..................... G08G 1/0104 455/456.1 |
| 2004/0137886 | A1 | 7/2004 | Ross et al. |
| 2004/0153552 | A1 | 8/2004 | Trossen et al. |
| 2004/0203854 | A1 | 10/2004 | Nowak |
| 2005/0101335 | A1 * | 5/2005 | Kelly ................... G06Q 10/109 455/456.3 |
| 2005/0143097 | A1 | 6/2005 | Wilson et al. |
| 2006/0046712 | A1 | 3/2006 | Shamp et al. |
| 2006/0111126 | A1 | 5/2006 | Chithambaram |
| 2007/0190494 | A1 * | 8/2007 | Rosenberg ............. A63F 13/12 434/11 |
| 2007/0214180 | A1 | 9/2007 | Crawford |
| 2007/0270160 | A1 * | 11/2007 | Hampel ............. G06Q 30/0261 455/456.1 |
| 2007/0273583 | A1 | 11/2007 | Rosenberg |
| 2008/0032719 | A1 * | 2/2008 | Rosenberg ............. G06Q 30/02 455/466 |
| 2008/0088437 | A1 * | 4/2008 | Aninye ................ G07C 9/00111 340/539.13 |
| 2010/0222081 | A1 | 9/2010 | Ward et al. |
| 2012/0220314 | A1 | 8/2012 | Altman et al. |
| 2012/0276884 | A1 * | 11/2012 | Othmer ............. H04M 1/72572 455/414.3 |
| 2013/0137472 | A1 | 5/2013 | Lohtia et al. |

OTHER PUBLICATIONS

PCT International Preliminary Report on Patentability of PCT/US2007/073049; dated Jan. 13, 2009 (5 pages).

* cited by examiner

SYSTEM AND METHOD FOR GENERATING USE STATISTICS FOR LOCATION-BASED APPLICATIONS

PRIORITY CLAIM/RELATED APPLICATIONS

This application is a continuation of U.S. patent application Ser. No. 12/961,117, filed Dec. 6, 2010, which claims priority under 35 USC 120 and is a divisional of U.S. patent application Ser. No. 11/805,078 filed on May 22, 2007 and entitled "System And Method For Generating Use Statistics For Location-Based Applications" which in turns claims the benefit under 35 USC 119(e) to U.S. Provisional Patent Application No. 60/830,367 filed on Jul. 12, 2006 and entitled "System And Method For Generating Use Statistics For Location-Based Applications", the entirety of which are incorporated herein by reference.

FIELD

The present invention is directed to a system and method for tracking location-based application use, and more particularly, for generating data of such use as a function of geographic location.

BACKGROUND

The use of location-based services or applications for portable devices, most commonly in a cellular telephone network, have become widespread. These are services or applications that are provided to subscribers based on their current geographic location. Such applications are LOC-AID® People™, which allows one user to know the location of another user merely by dialing the target user's cellular phone number and LOC-AID® GEO-FAM™ an application for notifying a user when the cell phone of another user has either entered or left a predetermined geographical region. These location-based applications provided by LOC-AID Technologies, Inc. are by way of example only. Other location-based applications may identify certain commercial establishments within a predetermined area of the cellular phone or may even respond to queries from the cellular phone user as to places of interest or people of interest.

For end users of location-based services, the technology although developing has been satisfactory, as evidenced by the growing number of location-based service users. However, for location-based service developers and for commercial entities making use of location-based services to drive traffic to their establishments, the current model for location-based service use has been less than satisfactory. Specifically, location-based services as provided on cellular phones are driven by the actual location of the user at the time of use of the location-based service. Developers of location-based services develop these applications in response to a perceived need. But in actuality, they design these applications in a vacuum because there is no feedback with respect to how the applications are actually used. Although the number of times a location-based application may be monitored, and in some cases the time of use may be monitored, there is no monitoring where the application is being used. Because these applications are location driven this is a vital statistic for monitoring application adoption and use.

Furthermore, in some instances these location-based applications are created to direct traffic to a specific location such as a restaurant, store or other point of interest to the end consumer of the location-based application. In order to better develop marketing schemes, these location entities need to know where the users of the location-based applications are in fact located when using an application designed to motivate that user to visit their location.

Accordingly, a methodology and system which overcomes the shortcomings of the prior art by providing information regarding use of location-based applications as a function of the geographic location of the user when making use of the location-based application is desired.

SUMMARY

A location-based services applications provider provides a location-based service application to be utilized at a mobile device. A mobile device performs the location-based service provided by the application provider. The mobile device is located within a positioning infrastructure for determining the location of the mobile device when utilizing a location-based services application. An analytic server is provided in communication with the positioning infrastructure to determine the location of the mobile device as it utilizes the location-based service and location stamps the use of the respective location-based service applications and stores the geostamp for the location-based application usage. The analytical server performs a task in accordance with rules as a function of the geostamp of the location-based service application.

In a preferred embodiment, the analytic server creates a report of use of location-based applications as a function of the location of the mobile device during use of the location-based service. In another embodiment, the analytic server may cause a message to be sent to the mobile device as a function of the geostamp associated with the location-based service application.

BRIEF DESCRIPTION OF THE DRAWINGS

For a fuller understanding of the invention, reference is had to the following description taken in connection with the following drawings in which.

DETAILED DESCRIPTION OF ONE OR MORE EMBODIMENTS

Figure 1:
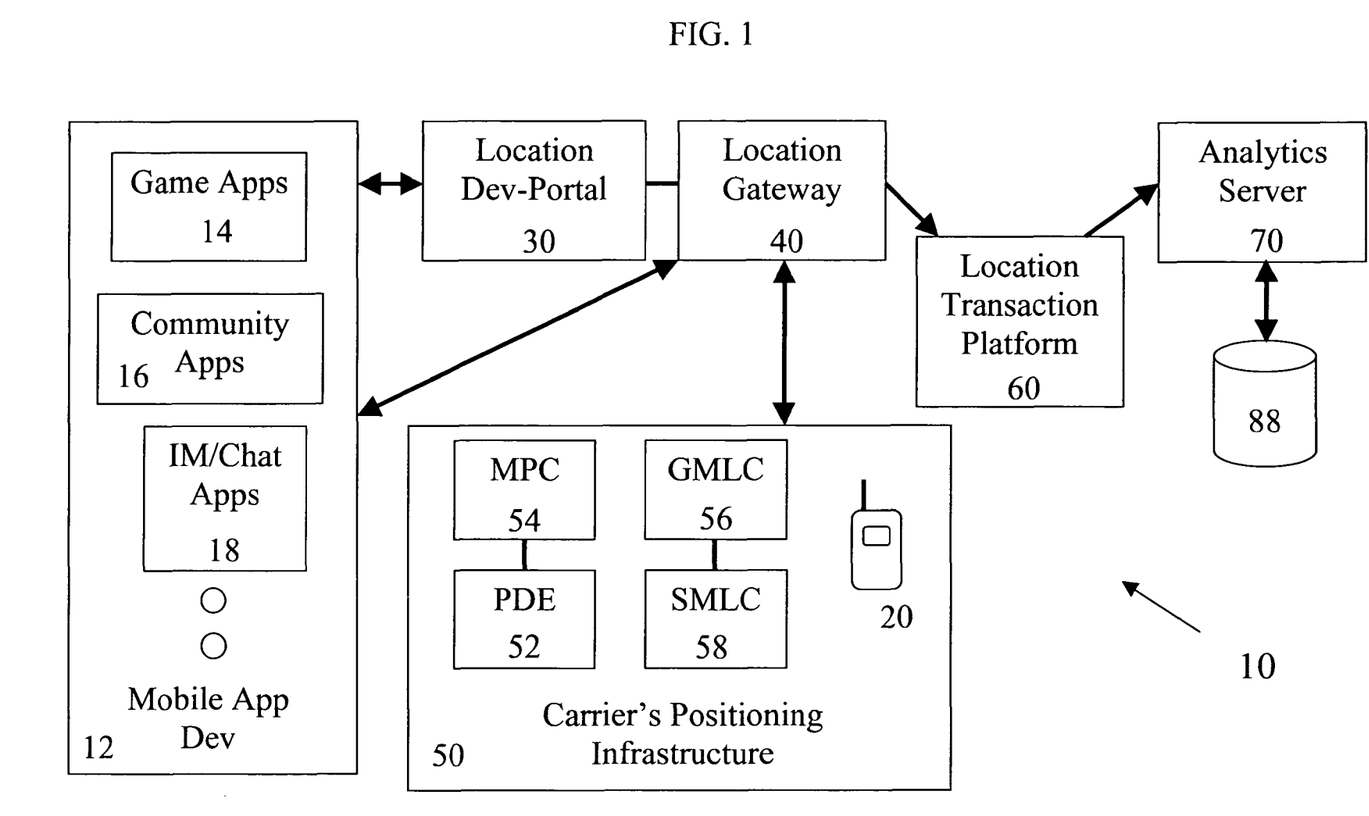
FIG. 1 is a schematic diagram of a system for analyzing and performing a task in response to use of location-based service applications in accordance with the invention.

Reference is made to FIG. 1 in which a system, generally indicated as 10, for analyzing and performing tasks in response to geographical data collected with respect to the use of location-based service application is provided. System 10 includes an application source 12. Application source 12 is the application provider, i.e., the developer and source of location-based service applications. In one contemplated embodiment, the application provider may be the server for an application service provider. The application service provider may be any one of a games applications provider 14, a community applications provider 16, by way of example FIND ME™, or an instant message chat-type of applications provider 18. It should be understood that the applications may also be downloaded as is known in the art to mobile device 20 such as a cellular phone.

Mobile device 20 communicates with location-based application source 12 across a carrier positioning infrastructure 50 as known in the art. An exemplary, but non-limiting example of such a carrier positioning infrastructure 50 may include a position determining entity ("PDE") server 52 working in cooperation with a mobile positioning center ("MPC") 54 utilizing protocols to communicate between the mobile application provider server 12 and mobile device 20. However, it should be noted that PDE 52 and MPC 54 may be any position-determining architecture such as a general mobile locating center 56 or a specific mobile locating center 58. The actual configuration is determined as a function of the communication technology or location technology utilized within carrier positioning infrastructure 50.

To facilitate the use of the location-based service application by mobile device 20 in a preferred embodiment, certain infrastructure is utilized. In one embodiment, it has been recognized that application providers are not capable of designing a location-based service application capable of communicating across all communication platforms, all communication carriers and the various associated protocols. Accordingly, a location development portal 30 provides infrastructure which allows the location-based service application provider to create location-based applications capable of interacting with substantially any mobile device across any mobile carrier as known from applicant's co-pending U.S. Provisional Application No. 60/715,848, which is incorporated as if fully set forth herein.

Once an application has been developed, there are still other compatibility issues. Each country, even each service carrier, develops its own protocols for using wireless services. Carriers may even use a plurality of location-based platforms or technologies within a network. Furthermore, as a result of the proprietary nature of carrier networks, one carrier may not allow another carrier to provide location-based service on its network, i.e., the protocols and technologies are designed to be cross-incompatible. To alleviate this issue, a gateway 40 as known from applicant's co-pending U.S. application Ser. No. 11/394,681 (referenced as if incorporated fully herein) is provided to allow communication and use of the location-based service application across a plurality of carrier positioning infrastructures.

A location transaction platform 60 is in communication with the carrier positioning infrastructure and monitors use of location-based service transactions, i.e., each occurrence of the use of a location-based services application by a mobile device 20. Location transaction platform 60, at a minimum, notes the application and the location at which the application is utilized for each use of the location-based service application for each respective mobile device 20 being monitored and location stamps the use of the location-based application. In other words, it marks the longitude and latitude ("geostamps" or "location stamps"), or physical map location of the use of the location-based application by mobile device 20, which in a preferred embodiment is a cellular phone. The user may geostamp themselves by sending their location or confirming that they are at an expected location (even if inaccurate).

In a preferred embodiment, several types of application information may travel with the utilization of the location-based service such as the time and date of the use, the identity of the provider of the application, or the identification of the user (whether by name, numeric ID, phone number or the like) by way of non-limiting example.

In another embodiment, the application information may include information related to the utilization of a location-based application, for example, a gaming application. By way of a non-limiting example, the gaming application may be a treasure hunt in which gamers are directed to a venue to search for objects and win prizes for finding and retrieving the objects. A venue is a physical location for the location-based application, for example, a city park, an address, or a latitude, longitude geographic coordinate. The venue may include a physical area or place were events of a specific type are held, for example, a city block delineated by streets or street intersections, or a radial distance from an address. The location-based application can include one or more venues, for example, a grocery store, a parking garage, or a waypoint venue on the way to a final destination venue. For example, the treasure hunt may include a first venue, such as, 123 Main Street, where gamers are instructed to find an object, for example, an envelope. The gamers may be provided a tip or hint for finding the object, for example, "check under the sign for product X." Gamers can be directed toward a second venue, and third venue, and so on, until they complete the treasure hunt.

By way of another example, the location-based application may be a conference trivia contest for which users are directed to select a sponsor and instructed to go a to venue of the selected sponsor. For example, the venue may be the selected sponsor's exhibit booth where users are presented with trivia questions.

The location transaction platform 60 may accept messages from a location-based application user, for example, a message from the treasure hunt game user or trivia contest player, described above. In one embodiment, the message may be a message that a mobile device user has opted to participate (or to not participate) in a location-based application. In another embodiment, the message may be a message that a mobile device user has opted to engage (or to not engage) in a location-based venue. In still another embodiment, the message may be a message that a mobile device user is at a location-based application venue.

Location transaction platform 60 is further in communication with analytics server 70 associated with a database 88. Analytics server 70 receives the location stamp and associated application information from the location transaction platform 60. Analytics server 70 stores the information in a database 88. The rules of operation of analytics server 70 are also stored in database 88. These rules govern the tasks performed by analytics server 70 as a function of the location stamp and associated application, which will be discussed in greater detail below.

Figure 3:
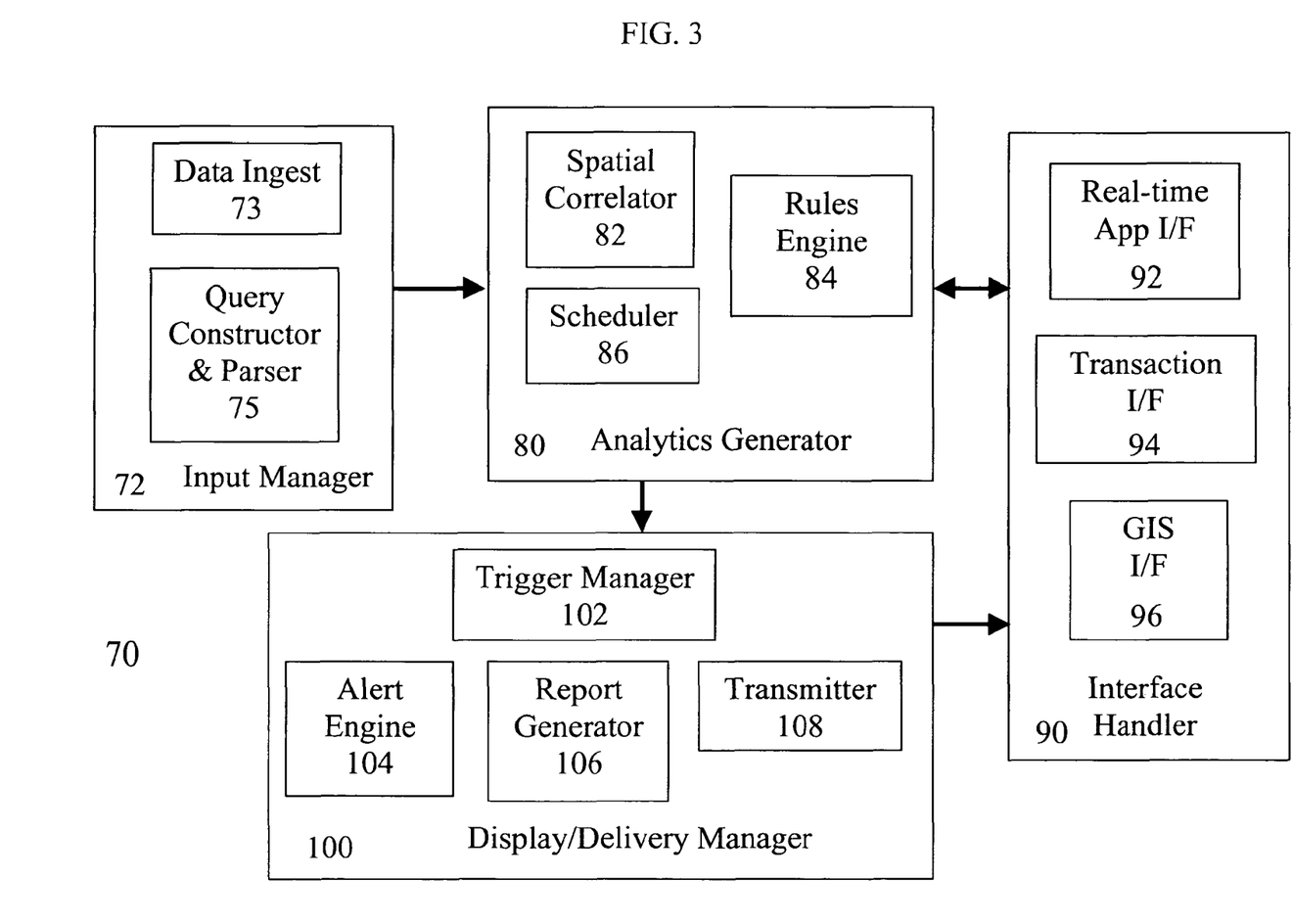
FIG. 3 is a schematic diagram of the functional components of the analytic server in accordance with the invention.

Reference is now made to FIG. 3 in which a functional diagram of analytics server 70 is provided. Analytics server 70 includes an analytics generator 80 for operating on geostamped data and input manager 72, which provides inputs to be operated upon by the analytics generator 80. An interface handler 90 provides input to and receives output from the analytics generator 80. The display delivery manager 100 determines when and what type of output the analytics server 70 will provide as a function of the rules.

In a generic sense, analytics server 70 accepts and operates on geographically framed queries and generates demographic data of where users are geographically when they interact with a location-based service application. The queries may take several forms such as, where is the use of the location-based service application relative to a point of interest? where is the location-based service application use relative to a geographic boundary? what is the demographic? (how close is the use to a store or landmark of interest) (are a significant number of uses coming from a specific one or more geographic area? such as college campuses, public parks, by way of non-limiting examples). Furthermore, the query can be made more sophisticated to layer on time and date information to the geographical queries, or even where allowed, demographic data with respect to the users.

Analytics server 70 may manipulate this data and determine things such as which location-enabled applications are utilized more frequently, which networks are utilized for more location-based transactions, where the location of location-based application or person-to-person interaction is utilized, and where the users of a location-based service application of interest are located.

Analytics server 70 operates in accordance with rules as a function of the information garnered. By way of non-limiting example, it acts on geographically framed queries such as creating a map to determine where the users are located when they interact with a particular location-based service application or demonstrate how far away they are from one of the points of interest. Analytics server 70 may deliver map-oriented or text-based statistics. In another embodiment, analytics server 70 may provide interactive feedback triggered by the use of a location-based service application as a function of the location of the user. By way of non-limiting example, if the location-based service application is to determine the proximity of a user to a point of interest such as a coffee shop, analytics server 70 determines the location of the user by determining the location of the mobile device and when the mobile device 20 is within a predetermined distance of the location of interest. Analytics server 70 may cause location transaction platform 60 to initiate a secondary location-based service application such as providing an alert to the mobile device 20 that they are in proximity of the coffee shop, a coupon for use at the coffee shop, or information such as a menu or sales prices, by way of non-limiting example.

Reference is again made to FIG. 3 where an operational diagram is provided to describe the function of the analytics server 70 in greater detail. Analytics server 70 includes input manager 72 which provides the functionality of data ingest at a data ingest 73, which includes the places of interest such as museums, stores, restaurants, movie theaters or the like. Input manager 72 also performs the parsing and construction of queries of interest to users of analytics server 70 at a query constructor and parser 75. These queries may be, where does a location-based application of interest get utilized? over which networks does the location-based application get utilized? where is the location-based application being utilized? how far away are the uses of the location-based application from a place of interest? by way of non-limiting example. The queries and data are input to analytics generator 80.

Analytics generator 80 spatially correlates the data and schedules tasks by performing the rules. Analytics generator 80 includes a spatial correlator 82 which compares locations in accordance with the query. It determines whether the query applies, i.e., is the use of the location-based application at a geographical location of concern or has confirmation from the cellular phone been received. A rules engine 84 applies the rule such as those discussed above. As scheduler 86 acts as the gateway scheduling the application of the rules by determining when a location-based service application use is occurring and as a function of the rules engine 84, either realtime triggers or accumulation of use data, schedules the output from analytics generator 80 prescribed by the rules as determined by rules engine 84. By way of non-limiting example, scheduler 86 may allow analytics generator to perform the task in accordance with the rules as a function of an instantaneous realtime trigger, i.e., query has been applied, rule indicates that a response must be immediately performed, such as a rule that a secondary location-based application must be sent to mobile device 20 in response as a function of the query—"Is the mobile device within a predetermined geographical area or near a geographical place of interest". On the other hand, scheduler 86 may release the application of the rule as a function of the aggregated number of data points or elapsed time. This release may be in response to a query such as "where or when are the greatest number of uses of the application of interest". This would require a meaningful sampling and therefore would require aggregation of multiple data points, not a single data point causing scheduler to accumulate occurrences before performance of the task in accordance with the rules.

Figure 4:
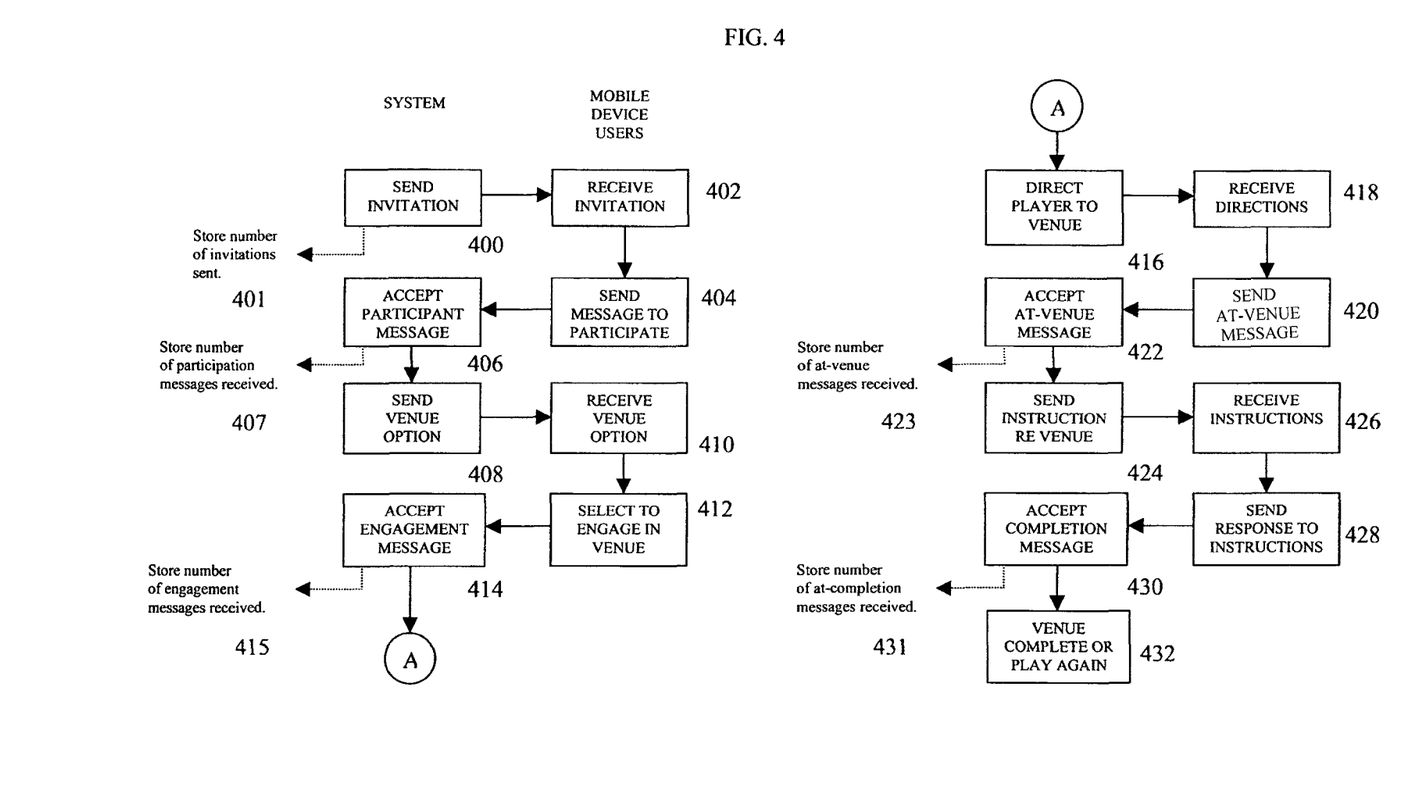
FIG. 4 is a flow chart for tracking metrics for a location-based game in accordance with the invention.

By way of example, the location-based application can be the treasure hunt game described above. As shown in FIG. 4, the location-based application may send to mobile device users, for example, mobile device users registered with a wireless carrier service, an invitation in step 400 to participate in the activity. For example, the invitation can be "Do you want to play the Product X Treasure Hunt Challenge?" Mobile device users can receive the invitation message in step 402 and send a participation message in step 404 in response to the invitation, for example, by selecting on their mobile device an option to participate or an option to not participate and selecting "send response." Alternatively, users may ignore the campaign message, in which case no participation message is sent. The participation message is accepted by a location transaction server in step 406. The location transaction server can accept a plurality of participation messages from mobile device users responding to the invitation message. The number of invitation messages sent in step 400 and the number of participation messages received (and the selection) in step 406 can be stored in steps 401 and 407, respectively, in the system in a memory, for example, a computer hard drive or a compact disk.

The location-based application can send to participating mobile device users a menu of game venue options in step 408, for example, a list of locations (Bob's Barber Shop, Jim's Diner, etc.) for the treasure hunt game or a list of sponsors (Company X, Company Y, etc.) for the conference trivia contest. The mobile device users can receive the venue options in step 410 and send an engagement message to opt-in or opt-out of a particular venue option in step 412. For example, the user can select, "Bob's Barber Shop" and "opt-in." The location transaction server can accept the engagement message in step 414. The number of engagement messages received is stored in step 415 in the system memory.

The location-based application can send to engaged mobile device users an instruction to proceed to the selected venue in step 416. For example, the instruction can be, "Proceed to 123 Main Street." The mobile device users can receive the instruction in step 418 and choose whether to follow the instruction. For example, the mobile device users can proceed to 123 Main Street. In one embodiment, a mobile device user can send an at-venue message to the system in step 420 to inform system 10 that the mobile device user is at or near the venue. In still another embodiment, system 10 can automatically track the user's location and determine if the user is at or near the venue. The location transaction server can accept the at-venue message in step 422. The number of at-venue messages received is stored in step 423 in the memory.

The location transaction server can send further instructions in step 424 related to the location-based application and venue. For example, the instruction may be related to the treasure hunt game, for example, "Find white envelope." The instruction can include a tip, for example, "Check under the sign for Product X." Mobile device users receive the instructions in step 426 and send a response in step 428. The location transaction server can accept the response and completion of the at-venue instruction in step 430. The number of completion messages received is stored in step 431 in the memory. The location transaction server can complete the game or offer instructions to play again in step 432 for multiple at-venue game sequences or loops.

An analytics server 70 can perform tasks to compute a variety of metrics using predefined rules as a function of location-based application information. In one embodiment, the metric may be a participation rate related to accepted participation messages. In another embodiment, the metrics may be an engagement rate related to accepted engagement messages. In still another embodiment, the metric may be an at-venue metric related to accepted at-venue messages described above. The location transaction platform 60 communicates message information to the analytics server 70, which is associated with a database 88. The analytics server 70 stores the information in the database 88 (memory). The analytics server 70 computes the metrics according to the predefined rules. For example, the message information may be the number of campaign invitations sent to mobile users stored in step 401, the number of mobile device users who opted to participate in the campaign stored in step 407, the number of mobile device users who selected a location-based venue stored in step 415, or the number of mobile device users who indicated they were at a venue stored in step 423.

By way of example, the location transaction platform 60 can communicate the number of campaign invitations (NO_INVS) sent to mobile devices users and the number of mobile device users who opted to participate in the campaign (NO_PARTS). The analytics server 70 can compute the participation rate as the ratio of the NO_PARTS over NO_INVS and multiply the result by 100 to obtain a percentage value. For example, if NO_INVS=1000 and NO_PARTS=250, the participation rate is 25%. The analytics server 70 can compute the engagement rate as the ratio of the number of mobile device users who selected to engage in venues (NO_ENGAGE) over the NO_PARTS. For example, if the NO_ENGAGE=125, the engagement rate is 50%. The analytics server 70 can compute the at-venue rate as the ratio of the number of mobile device users who indicated that they were at a venue (NO_VEN) over the NO_ENGAGE. For example, if the NO_VEN=75, the at-venue rate is 60%. The formulas for these computations are stored as part of the predefined rules. A venue completion rate can also be computed, for example, the percentage of mobile device users who completed the venue.

The interface handler 90 includes three interfaces. The first interface is the realtime application interface 92, which is the output interface to the portable device 20, or the receiver of the report. The transaction interface 94 is the input interface which monitors the occurrence of the location-based services input and may also monitor the data associated with the location-based service application occurrence. Because of the nature of geographical location-based services, a geographic interface 96 interacts with that portion of the carrier positioning infrastructure 50, third party map source, or location based service application provider which provides map and location information. The interface handler 90 communicates with the analytics generator 80 to provide the data utilized by spatial correlator 82 received at realtime application interface 92 and geographic interface 96.

The transaction interface may receive occurrence information related to venues for a location-based application as described above. For example, the occurrence information may be a participation message, an engagement message, an at-venue message, or a venue completion message as described above. The analytics server may receive the occurrence information to compute campaign metrics, for example, a participation rate, an engagement rate, an at-venue rate, and a completion rate as described above.

Lastly, display/delivery manager 100 communicates with both analytics generator 80 and interface handler 90. Display/delivery manager 100 includes a trigger manager 102, which determines whether all the conditions were met to trigger the task in accordance with the rules engine 84 and the query. The trigger manager operates in response to a signal from scheduler 86. If the trigger manager 102 determines that a response to the output is proper, it reports in one of at least three exemplary ways. An alert engine 104 may be triggered to send an alert of use through interface handler 90 that a condition of interest has occurred. As discussed above, rules engine 84 may create a report in response to a query and trigger manager 102 may cause report generator 106 to create the desired report, which is then output through realtime application interface 92 to the desired recipient, normally the provider of the location-based application or the owner of the place of interest. As discussed above, in some instances, rules engine 84 determines that an instantaneous location message or other location-based service application should be sent to mobile device 20. In this case, trigger manager 102 causes transmission of the output of rules engine 84 to transaction interface 94 and on to mobile device 20 utilizing transmitter 108.

Figure 2:
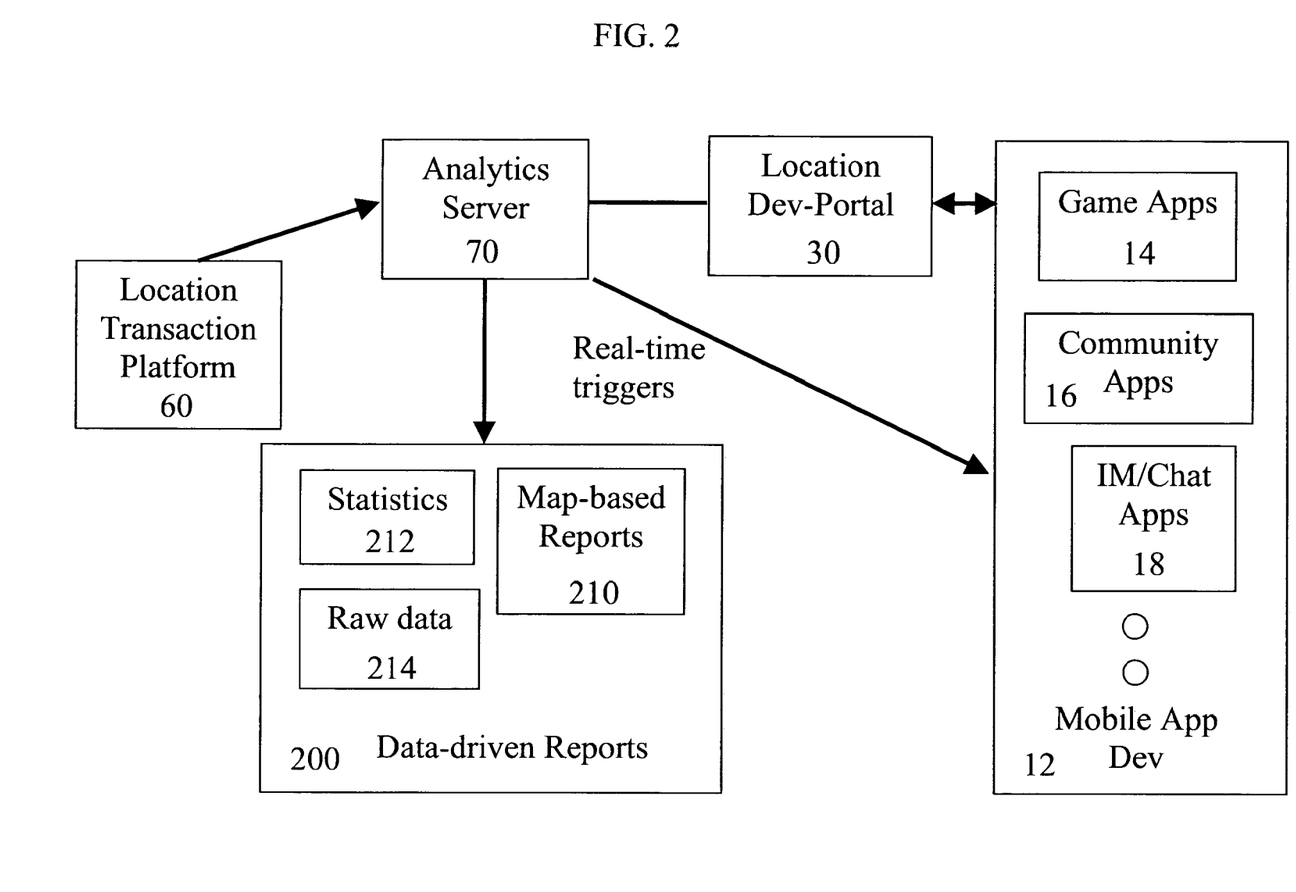
FIG. 2 is an operational diagram showing an analytic server performing tasks in accordance with the rules in accordance with the invention.

Reference is now made to FIG. 2 wherein a functional diagram of the operation of analytics server 70, like numbers are utilized to indicate like structure or functionality. As discussed above, during use, the occurrence of a location-based services application transaction is communicated from location transaction platform 60 to analytics server 70. In accordance with the rules, analytics server 70 performs a task, either analyzing geographic data, creating a data-driven report 200 or performing a non-reporting function such as a realtime trigger to provide a secondary location-based application to mobile device 20.

Analytics server 70 provides data-driven reports such as map-based reports 210, which may take the form of two dimensional or three dimensional plotting of occurrences on a map grid. It may be a statistics report 212 which would take the form of statistics correlating application use, and location of such use, and optionally time of such use, and other demographics of such use. Lastly, a report 214 may take the form of a raw data dump, merely being a printout of each of the data points as determined by analytics server 70.

On the other hand, in accordance with the rules, analytics server 70 may output a realtime trigger to mobile application developers 12 for monitoring purposes or for an appropriate location-based service application to be sent to mobile device 20 in response to an occurrence of a predetermined geographical location-based criteria for a particular location-based systems application.

It should be noted that for those instances where necessary the location development portal 30 and location gateway 40 may be utilized to enable analytics server 70 to communicate with the mobile applications providers 12. However this is not necessary for performance of the invention. It should also be noted that a generic mobile device 20 was utilized. However, mobile device 20 is preferably a cellular phone but may be a personal digital assistant, automatic vehicle location ID or the like. Furthermore, database 88 is shown as associated with analytics server 70. However, it should be readily understood that it is within the concept of the invention, as each element of a system is within a communications network, that the functionality and the data storage or analytics analysis may be distributed across the network. Conversely, it is well within the scope of the invention to combine the functionality of analytics server 70 and location transaction platform 60 into a single location or server.

By providing an analytics server, which location stamps location-based service application use by mobile devices, a new analytic and customer service tool is provided. It provides marketing advantages by identifying geographically based hot spots for location-based system application uses which enables campaign response feedback and use feedback; allowing developers and marketers to tweak the applications to better serve the needs of the end user. By triggering actions with realtime triggers which cause the use of secondary or responsive location-based service applications, push marketing is enabled to market to those people who are already within a meaningful distance of a place or service of interest.

Thus, while there have been shown, described, and pointed out novel features of the present invention as applied to preferred embodiments thereof, it will be understood that various omissions and substitutions and change in the form and detail are contemplated and may be made by those skilled in the art without departing from the spirit and scope of the invention. It is the intention therefore to be limited only as indicated by the scope of the claims appended hereto. It is also to be understood that the following claims are intended to cover all of the generic and specific features of the invention herein described and all statements of the scope of the invention, which, as a matter of the language, might be said to fall therebetween.

The invention claimed is:

1. A system for analyzing a use of a location-based service application within a mobile network comprising:
   a location transaction platform for monitoring the use of the location-based application by a plurality of mobile devices and receiving occurrence information including a location of each of the plurality of mobile devices during the use of said location-based application and a time for each respective use;
   a processor for aggregating the received occurrence information for said location-based application;
   an input manager for receiving a request for specific analytic information for said location-based application and its users; and
   an analytics generator communicating with said location transaction platform for receiving the aggregated occurrence information regarding the occurrence of the uses of said location-based application by the plurality of mobile devices, communicating with the input manager for comparing the location of the mobile devices during use of said location-based application, and scheduling a task based on the aggregated occurrence information for the location-based application.

2. The system of claim 1, further comprising a display/delivery manager for triggering the scheduled task.

3. The system of claim 1, wherein the task is creating a report regarding the use of said location-based application by the plurality of mobile devices.

4. The system of claim 3, wherein the report is one of a two-dimensional or three-dimensional map.

5. The system of claim 3, wherein the report is a text report providing statistics of the use of said location-based application by the plurality of mobile devices as a function of location.

6. The system of claim 3, wherein the report is raw data of the use of said location-based application by the plurality of mobile devices.

7. The system of claim 1, wherein the task is causing a mobile application provider to provide another location-based application to a mobile device.

8. The system of claim 1, wherein said scheduling a task is also based on a plurality of predetermined rules.

9. The system of claim 8, wherein at least one of the predetermined rules is determining where said location-based application is used over a period of time.

10. The system of claim 8, wherein at least one of the predetermined rules is where the occurrence of use of said location-based application is relative to a place of interest, or determining the location of the occurrence of the use of said location-based application relative to a geographical area.

11. The system of claim 1, wherein the occurrence information further comprises a venue for the location-based application, and an engagement message for communicating an engagement in the venue.

12. The system of claim 11, wherein the task is computing an engagement rate for the venue.

13. A method for analyzing a use of a location-based service application within a mobile network comprising:
    monitoring the use of the location-based application by a plurality of mobile devices;
    receiving occurrence information including a location of each of the plurality of mobile devices during the use of said location-based application and a time for each respective use;
    aggregating the received occurrence information for said location-based application;
    receiving a request for specific analytic information for said location-based application and its users;
    receiving the aggregated occurrence information regarding the occurrence of the uses of said location-based application by the plurality of mobile devices;
    comparing locations of the mobile devices during use of said location-based application; and
    scheduling a task based on the aggregated occurrence information for the location-based application.

14. The method of claim 13, further comprising a triggering the scheduled task.

15. The method of claim 13, wherein the task is creating a report regarding the use of said location-based application by the plurality of mobile devices.

16. The method of claim 15, wherein the report is one or more of a two-dimensional map, a three-dimensional map, text report providing statistics of the use of said location-based application by the plurality of mobile devices as a function of location, and raw data of the use of said location-based application by the plurality of mobile devices.

17. The method of claim 13, wherein the task is causing a mobile application provider to provide another location-based application to a mobile device.

18. The method of claim 13, wherein the occurrence information further comprises a venue for the location-based application, and an engagement message for communicating an engagement in the venue.

19. The method of claim 18, wherein the task is computing an engagement rate for the venue.

20. The method of claim 13, wherein said scheduling a task is also based on a plurality of predetermined rules, and at least one of the predetermined rules is determining where said location-based application is used over a period of time.

* * * * *